United States Patent
Sawada

(10) Patent No.: US 6,649,952 B2
(45) Date of Patent: Nov. 18, 2003

(54) COLOR FILTER

(75) Inventor: Atsumasa Sawada, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 39 days.

(21) Appl. No.: 09/750,915

(22) Filed: Jan. 2, 2001

(65) Prior Publication Data

US 2001/0007488 A1 Jul. 12, 2001

(30) Foreign Application Priority Data

Jan. 7, 2000 (JP) ........................ 2000-001254

(51) Int. Cl.[7] ................. H01L 31/062; H01L 31/113; H01L 31/0203; H01L 21/00
(52) U.S. Cl. ................. 257/294; 257/435; 257/437; 438/48
(58) Field of Search ................. 257/294, 435, 257/437; 438/48

(56) References Cited

U.S. PATENT DOCUMENTS

| | | | |
|---|---|---|---|
| 5,321,250 A | | 6/1994 | Tajima |
| 5,835,177 A | * | 11/1998 | Dohjo et al. .......... 257/59 |
| 6,078,372 A | * | 6/2000 | Kim ................ 349/106 |
| 6,137,552 A | * | 10/2000 | Yanai .............. 349/106 |

FOREIGN PATENT DOCUMENTS

| | | |
|---|---|---|
| JP | A 60-247202 | 12/1985 |
| JP | A 4-110902 | 4/1992 |
| JP | 5-119306 | 5/1993 |
| JP | A 9-5733 | 1/1997 |
| JP | A 10-206888 | 8/1998 |

OTHER PUBLICATIONS

M. Maruyama et al., "An Ultra High Resolution TFT LCD Having a New Color Filter Structure", EURO Display 1999 Late–News Paper, pp 77–80.

* cited by examiner

Primary Examiner—Steven Loke
Assistant Examiner—Samuel Gebremariam
(74) Attorney, Agent, or Firm—Young & Thompson

(57) ABSTRACT

A color filter used in a color display device for displaying a color image by irradiating a color layer of the color filter with light includes a titanium dioxide layer having ultraviolet light shielding function formed in direct contact with the surface of the color layer at the upper side of the color layer in case that only the light incident on the color layer from the upper side of the color layer is prevented or an upper and lower titanium dioxide layers formed on and below the color layer in order to make the advantage being free from fading perfect. In the latter case, it is possible to restrict transmission of light having wavelength in the wavelength range of ultraviolet light to the color layer to thereby restrict direct decomposition of pigment molecules and obtain the advantage being free from fading, by directly covering the color filter with titanium dioxide at the upper side of the color layer and providing the lower titanium dioxide layer below the color layer.

11 Claims, 6 Drawing Sheets

COLOR FILTER

BACKGROUND OF THE INVENTION

1. Field of the Invention

The present invention relates to a color filter for use in a flat panel display and, particularly, to a structure of a color filter for a liquid crystal display device.

2. Description of the Prior Art

As a color filter for a liquid crystal display device, there are two types, in one of which a color filter is formed on the side of an opposing substrate opposing to a Thin Film Transistor (referred to as "TFT", hereinafter) substrate and in the other of which a color filter is formed on the side of the TFT substrate. FIG. 1 is a cross section of the first example of a color filter to be formed on the side of an opposing substrate. As shown in FIG. 1, the color filter has a structure including a transparent substrate 41, a black matrix 42 formed on the transparent substrate 41 by forming a lattice pattern with using photolithography, etc., a color layer 46 printed or covered by using photolithography with color materials such as dyes, organic pigments or inorganic pigments such that the color materials fill spaces between lattices of the black matrix 42, a resin film layer 44 covering the color layer 46 and the black matrix 42 and a pixel electrode 45 formed on the resin film layer 44.

FIG. 2 shows a cross section of the second example of the color filter to be formed on the side of the opposing substrate, which is disclosed in Japanese Patent Application Laid-open No. H5-119306 and may belong to the same category as that of the present invention. The second example, which is called as Color filter-On-TFT (COT), includes a transparent substrate 61, a color layer 66 formed on the transparent substrate 61, a resin film layer 64 formed on the color layer 66, an upper titanium dioxide ($TiO_2$) layer 73 formed on the resin film layer 64 and a pixel electrode 65 formed on the upper titanium dioxide layer 73. The upper titanium dioxide layer 73 is formed for improving adhesion between the resin film layer 64 and the pixel electrode layer 65.

FIG. 3 shows a cross section of the third example of the so-called color filter-on-TFT where a color filter is formed on the side of the TFT substrate, which is disclosed in EURO DISPLAY '99 LATE-NEWS PAPER P77–80. The third example includes a transparent substrate 81, a TFT formed thereon, which is composed of a gate wiring 87, a gate insulating film 88, a semiconductor film 91, a drain wiring 89 and a source wiring 90 and a protective insulating film 92 covering the TFT. As shown, an upper portion of the TFT except the protective insulating film 92 has a similar structure to that shown in FIG. 1. That is, a color layer 86 having an opening portion above the semiconductor film 91 of the TFT is formed on the protective insulating film 92 and the opening portion is filled with a black matrix 82. Further, the color layer 86 and a black matrix 82 are covered by a resin film layer 84 and a transparent pixel electrode 85 of ITO (Indium Tin Oxide).

However, in a liquid crystal display of such as IPS (In-Plane-Switched) system, which has no pixel electrode or the COT shown in FIG. 2, there is a possibility that a portion of the resin film layer 84 functioning as the over coat is exposed to the liquid crystal layer depending on a layout of the pixel electrode 85.

If the resin film layer 84 is exposed partially, oxygen contained in the liquid crystal layer diffuses through the exposed portion into the color layer 86. Oxygen molecules reached the color layer 86 are activated by excitation energy of external ultraviolet ray, so that color materials such as organic pigments used in the color layer are decomposed, resulting in color degradation.

Therefore, when a layer, which is formed above the color layer 86 in order to shut out oxygen molecules from the color layer 86, does not cover the color layer 86 completely, i.e., some part of the layer is opened above the color layer 86, some problems as mentioned above occurs in the conventional color filter substrate for liquid crystal display.

The structure including the upper titanium dioxide layer 73 such as shown in FIG. 2, which may block external ultraviolet ray, is known. In such color filter substrate, however, there is a possibility that the color layer 66 is degraded by activated oxygen dissolved in the resin film layer 64.

SUMMARY OF THE INVENTION

An object of the present invention is to provide a structure of a color filter which is not degraded by ultraviolet ray or oxygen on a substrate with a color filter.

In order to achieve the above object, the color filter according to the present invention includes a basic light shielding structure which blocks ultraviolet ray incident on a color layer formed on a substrate at least at the upper side of the color layer. The basic light shielding structure includes two types of light shielding structures, wherein the first light shielding structure blocking ultraviolet ray incident on the surface of the color layer at the upper side of the color layer by directly covering the surface of the color layer only at the upper side of the color layer and the second light shielding structure covering both on and below the color layer.

The first light shielding structure includes the color layer formed on the substrate and an upper light shielding layer, which directly covers the surface of the color layer at the upper side of the color layer.

The second light shielding structure includes an upper light shielding layer formed on the color layer and a lower light shielding layer formed below the color layer, blocking ultraviolet ray by both of the upper light shielding layer and the lower light shielding layer from the color layer. Furthermore, the upper light shielding layer covers the surface of the color layer at the upper side of the color layer, and more concretely covers directly the surface of the color layer at the upper side of the color layer.

The color filter according to the second light shielding structure of the present invention includes a substrate, a color layer on the substrate, a gate electrode and a semiconductor layer which composes a channel region of a TFT between the substrate and the color layer, the color layer being formed above the TFT, an upper light shielding layer covering the color layer. The color layer includes an opening area above the channel region of the TFT. The color filter further includes a black matrix layer formed between the TFT and the upper light shielding layer. The black matrix layer covers at least the opening area of the color layer and locates above the channel region of the TFT.

The light shielding structure of the color filter includes a titanium dioxide layer.

BRIEF DESCRIPTION OF THE DRAWINGS

The above mentioned and other objects, features and advantages of the present invention will become more apparent by reference to the following detailed description of the invention taken in conjunction with the accompanying drawings, in which.

DETAILED DESCRIPTION OF THE PREFERRED EMBODIMENTS

The first embodiment of the present invention will be described with reference to FIG. 4, which is a cross section of a color filter formed on the side of the opposing substrate opposing to a TFT substrate.

Figure 1:
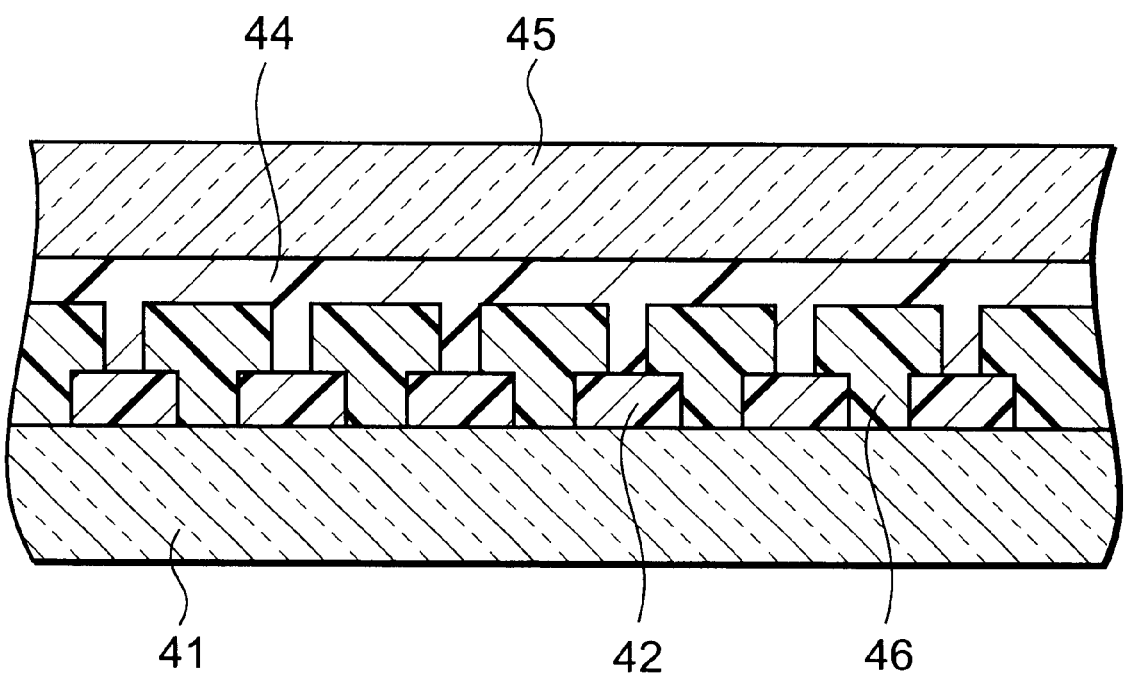
FIG. 1 is a cross section of the first example of a conventional color filter.
Figure 2:
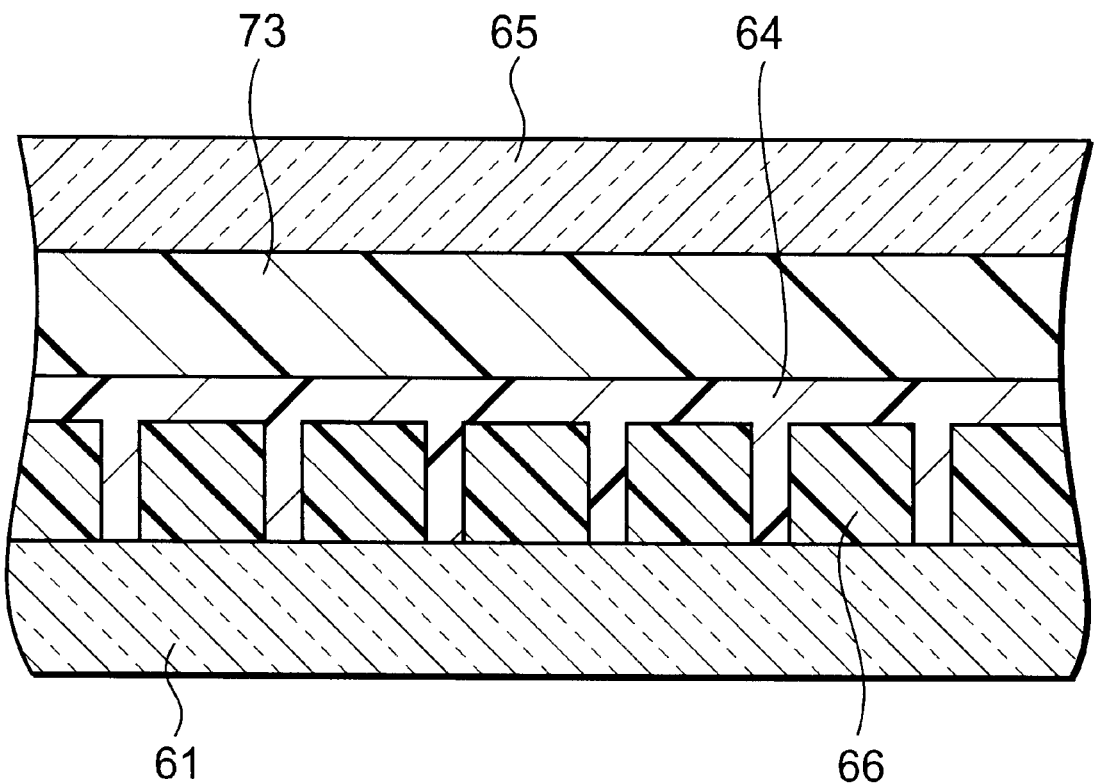
FIG. 2 is a cross section of the second example of the conventional color filter.
Figure 3:
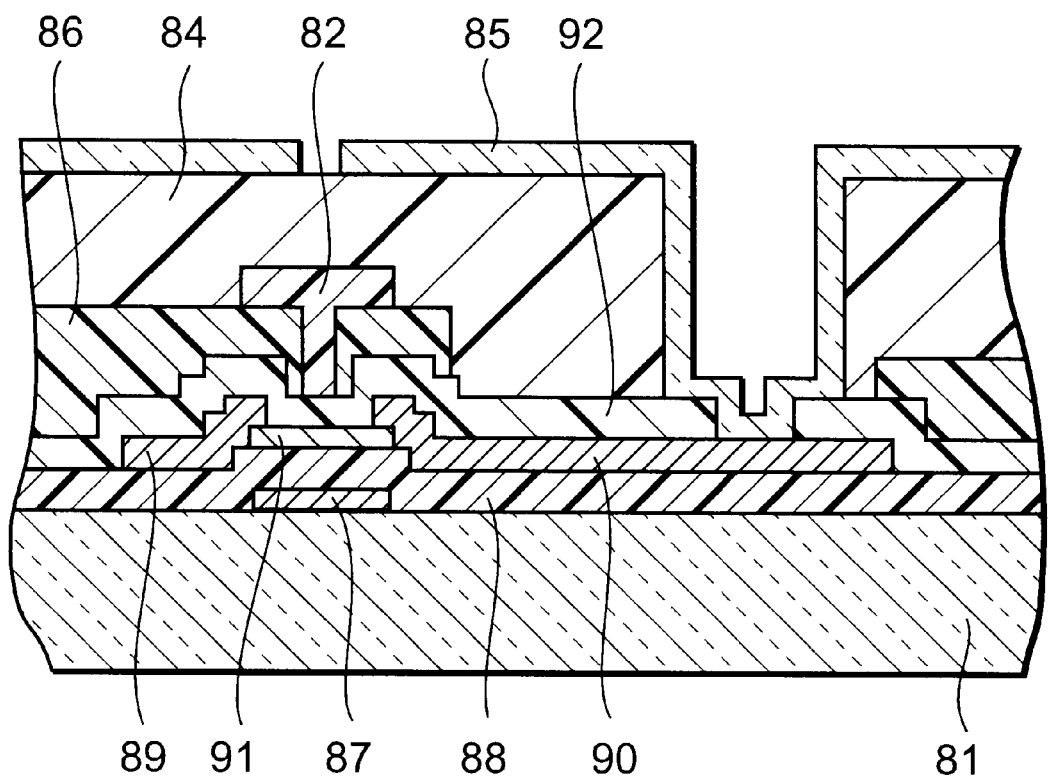
FIG. 3 is a cross section of the third example of the conventional color filter.
Figure 4:
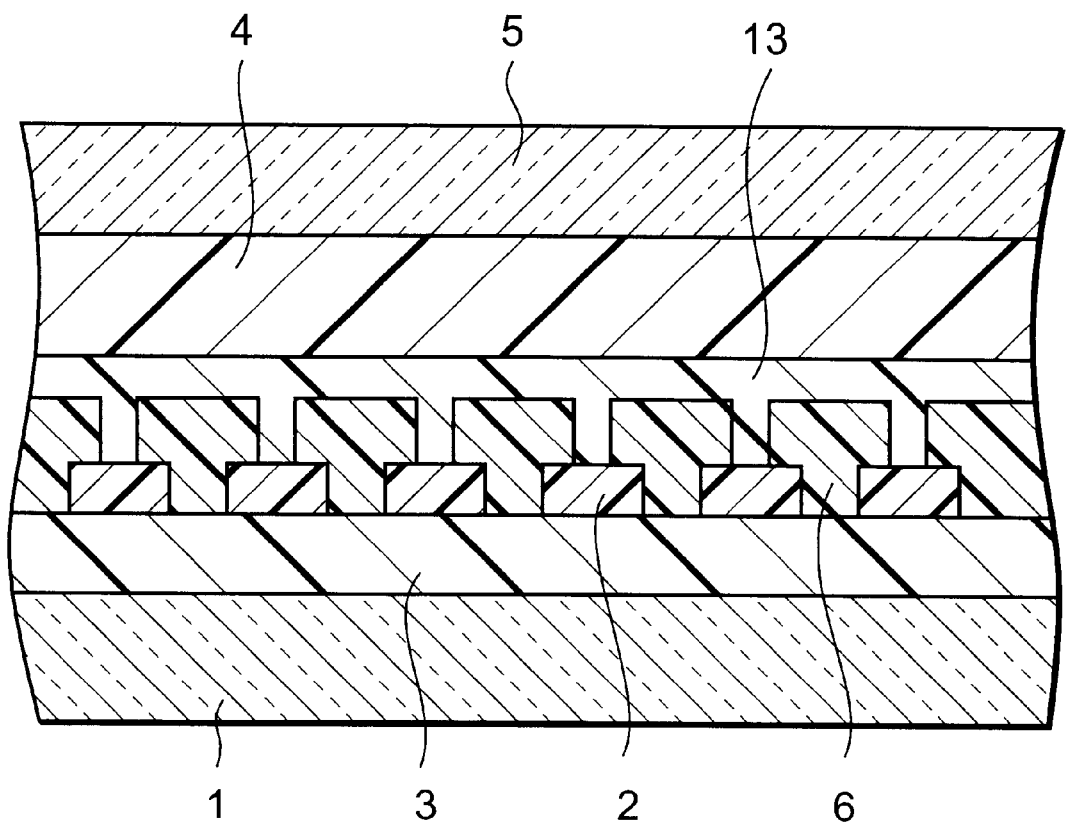
FIG. 4 is a cross section of a color filter according to the first embodiment of the present invention.

In FIG. 4, a color filter is composed of a transparent substrate 1, a lower titanium dioxide layer 3 capable of shielding ultraviolet ray, a black matrix 2, a color layer 6, an upper titanium dioxide layer 13 capable of shielding ultraviolet ray and blocking oxygen, a resin film layer 4 and a pixel electrode 5, all of which are formed on the transparent substrate 1 in the order. The lower titanium dioxide layer 3 and the upper titanium dioxide layer 13, which are several hundreds nm thick, are formed by vacuum deposition, chemical epitaxy or sputtering, etc., respectively. The black matrix 2, the color layer 6, the resin film layer 4 and the pixel electrode 5 are formed by using known methods, respectively.

Organic pigments to be contained in the color layer 6 of the color filter may include phthalocyanine derivatives, anthraquinone derivatives, indigo derivatives, oxazine derivatives and/or perylene derivatives, etc. These organic pigments generally have unsaturated groups necessary to shift up electron absorption wavelength spectrum of mother molecules of the pigments, which are strongly related to fading of pigments. The mechanism of fading may be considered due to decomposition of chromophore caused by active oxygen such as singlet term oxygen or direct decomposition of chromophore molecular structure caused by ultraviolet ray. Incidental chemical reactions of the degradation for the case of the decomposition of chromophore by active oxygen are as follows:

(Initiation)
pattern 1
   UV
   $RH \rightarrow R^{\cdot} + {}^{\cdot}H$
pattern 2
   UV
   $RH \rightarrow RH^{*}$ (excitation of pigment molecule)
(Propagation Reaction)
1. Production of hydroperoxide
pattern 1
   $R^{\cdot} + O_2 \rightarrow ROO^{\cdot}$
   $RH + ROO^{\cdot} \rightarrow R^{\cdot} + ROOH$
pattern 2
   $RH^{*} + O_2 \rightarrow ROOH$ 2. Production of oxyradical
pattern 1
   $ROOH \rightarrow RO^{\cdot} + {}^{\cdot}OH$
pattern 2
   $2ROOH \rightarrow ROO^{\cdot} + RO^{\cdot} + H_2O$
3. Decomposition of oxyradical
   $RH + RO^{\cdot} \rightarrow ROH + R^{\cdot}$ It is well known that titanium dioxide ($TiO_2$) has insensitivity and shielding characteristics to light having wavelength in ultraviolet light wavelength range. It is further known that titanium dioxide has oxygen blocking characteristics (cf. Japanese Patent Application Laid-open No. H5-119306). Since titanium dioxide is a single crystalline substance, which is transparent for visible light, it can be applied to a color filter.

From the foregoing, propagation of light having wavelength in ultraviolet wavelength range to the color layer 6 is prevented by the provision of the upper and lower titanium dioxide layers 13 and 3, so that it is possible to restrict direct decomposition of pigment molecules to thereby prevent fading. Further, since the upper titanium dioxide layer 13 blocks oxygen immigration into the color layer 6 and restricts autoxidation reaction, the advantage being free from fading is obtained.

Now, the second embodiment of the present invention will be described with reference to FIG. 5.

Figure 5:
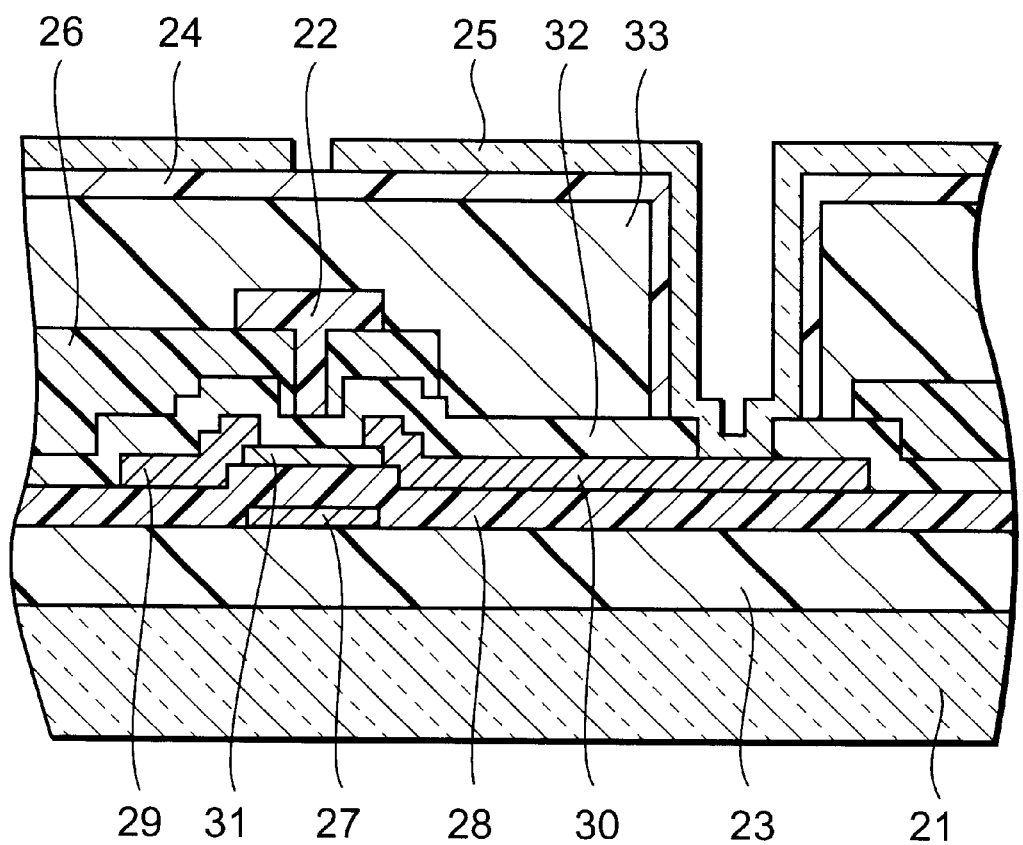
FIG. 5 is a cross section of a color filter according to the second embodiment of the present invention.

A color filter shown in FIG. 5 is composed of a transparent substrate 21, a lower titanium dioxide layer 23, a TFT including a gate wiring 27, a gate insulating film 28, a drain wiring 29, a source wiring 30, a semiconductor film 31 and a protective insulating film 32, a black matrix 22, a color layer 26, an upper titanium dioxide layer 33, a resin film layer 24 and a pixel electrode 25, all of which are formed on the transparent substrate 21 in the order. The lower titanium dioxide layer and the upper titanium dioxide layer, which are several hundreds nm thick, are formed by vacuum deposition, chemical epitaxy or sputtering, etc., respectively. The black matrix 22, the color layer 26, the resin film layer 24 and the pixel electrode 25 are formed by using known methods, respectively.

With the structure of the color filter on the TFT as mentioned above, the same advantages as those obtainable in the first embodiment can be obtained. That is, the upper and lower titanium dioxide layers function to prevent ultraviolet light from reaching the color layer 26 to thereby restrict direct decomposition of pigment molecules and, further, the upper titanium dioxide layer 33 functions to prevent oxygen from reaching the color layer 26 to thereby restrict progress of autoxidation reaction so that the advantage being free from fading is obtained.

In each of the described embodiments, the titanium dioxide layers are formed on and below the color layer. It should be noted, however, that the advantage being free from fading can be obtained by a color filter structure in which a titanium dioxide layer is formed in direct contact with the surface of the color layer only at the upper side of the color layer.

In the case where titanium dioxide having ultraviolet light shielding function is formed as the upper titanium dioxide layer only at the upper side of the color layer, the upper titanium dioxide is formed in direct contact with the surface of the color layer. In the case where, in order to make the advantage being free from fading perfect, the lower titanium dioxide layer is further formed, it is possible to restrict transmission of light having wavelength in the wavelength range of ultraviolet light to the color layer to thereby restrict direct decomposition of pigment molecules and obtain the advantage being free from fading, by directly covering the color filter with titanium dioxide at the upper side of the color layer and providing the lower titanium dioxide layer below the color layer. Further, since immigration of oxygen to the color layer from the upper side of the color layer is blocked, the advantage being free from fading by preventing autoxidation from making progress is also obtained.

Figure 6:
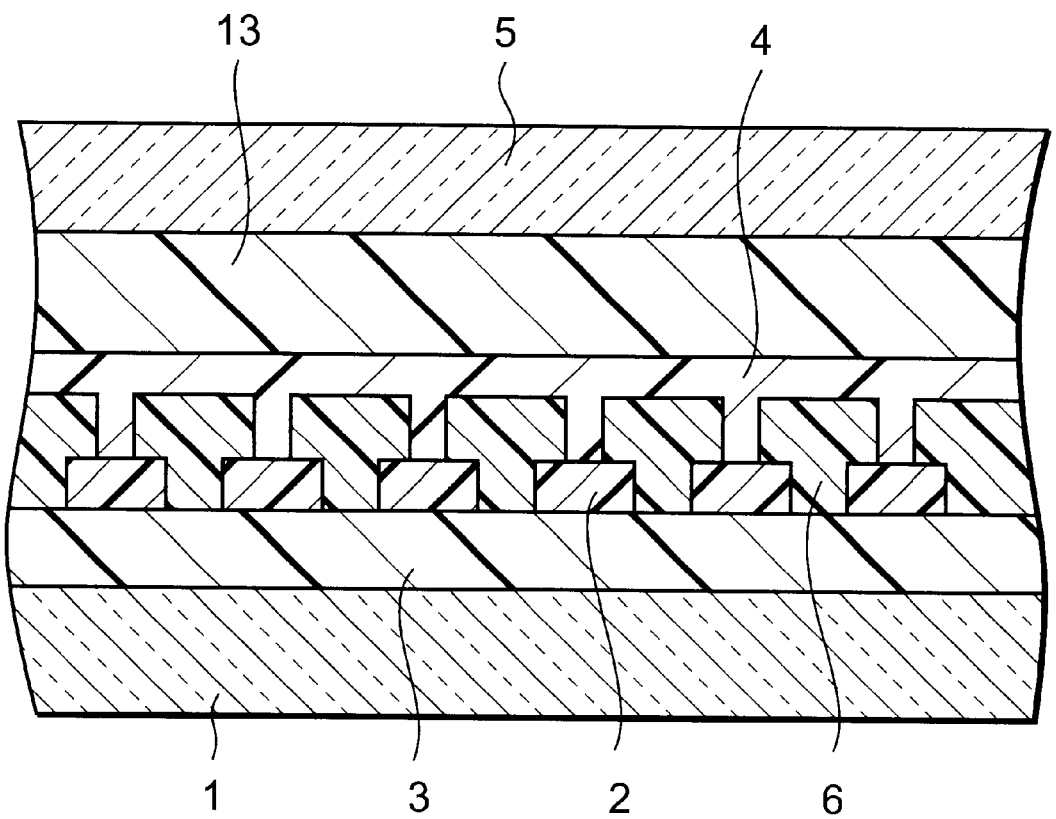
FIG. 6 is a cross section of a modification of the first embodiment of the present invention.

In addition, in the case of the first embodiment in which the upper and lower titanium dioxide layers are formed, when the relations of the titanium dioxide layers 13 and the resin film layer 4 is inverted as shown in FIG. 6 such that the resin film layer 4 is sandwiched between the color layer 6 and the titanium dioxide layer 13, the similar advantages in the first embodiment are obtained. In this structure, the possibility of fading may be increased correspondingly to the amount of oxygen contained in the resin film layer 4. However, the advantage being free from fading is larger than that obtainable by the second prior art example by the presence of the lower titanium dioxide layer.

What is claimed is:

1. A color filter comprising:

a color layer on a substrate; and a light shielding structure that sandwiches said color layer to shield said color layer from ultraviolet light, said light shielding structure comprising an upper light shielding layer and a lower light shielding layer, both of which shield said color layer from ultraviolet light, said upper light shielding layer directly covering a surface of said color layer opposite said lower light shielding layer wherein said lower light shielding layer is between said color layer and substrate.

2. The color filter of claim 1, wherein said lower light shielding layer is between said color layer and said substrate.

3. The color filter of claim 1, wherein each of said upper and lower light shielding layers comprises a titanium dioxide layer.

4. A color filter comprising:

a color layer on a substrate; and a light shielding structure that sandwiches said color layer to shield said color layer from ultraviolet light, said light shielding structure comprising an upper light shielding layer and a lower light shielding layer, both of which shield said color layer from ultraviolet light, said upper light shielding layer covering a first surface of said color layer opposite said lower light shielding layer wherein said lower light shielding layer is between said color layer and said substrate and being spaced from said first surface.

5. The color filter of claim 4, further comprising a thin film transistor between said substrate and said color layer, wherein said thin film transistor comprises a gate electrode and channel region in a semiconductor layer.

6. The color filter of claim 5, wherein said color layer comprises an opening above said channel region and black matrix layer between said thin film transistor and said upper light shielding layer, said black matrix layer covering said opening and said channel region.

7. The color filter of claim 5, wherein said lower light shielding layer is between said thin film transistor and said substrate.

8. The color filter of claim 4, wherein said upper light shielding layer is separated from said first surface of said color layer by a resin layer.

9. The color filter of claim 4, wherein at least one said upper and lower light shielding layers comprises a titanium dioxide layer.

10. A color filter comprising:

a color layer on a substrate; and a light shielding structure comprising two light shielding layers that sandwich said color layer and that both shield said color layer from ultraviolet light, wherein one of said light shielding layers directly covers a surface of said color layer opposite said substrate, wherein another of said light shielding layers is between said color layer and said substrate.

11. A color filter comprising:

a color layer on a substrate; and a light shielding structure comprising two light shielding layers that sandwich said color layer and that both shield said color layer from ultraviolet light, wherein one of said light shielding layer is spaced from a surface of said color layer opposite said substrate, wherein another of said light shielding layers is between said color layer and said substrate.

\* \* \* \* \*